(12) United States Patent
Ciesco

(10) Patent No.: US 8,466,966 B1
(45) Date of Patent: Jun. 18, 2013

(54) VIDEO CALIBRATION DEVICE

(76) Inventor: Thomas E. Ciesco, Northford, CT (US)

(*) Notice: Subject to any disclaimer, the term of this patent is extended or adjusted under 35 U.S.C. 154(b) by 612 days.

(21) Appl. No.: 12/722,418

(22) Filed: Mar. 11, 2010

Related U.S. Application Data

(60) Provisional application No. 61/159,238, filed on Mar. 11, 2009.

(51) Int. Cl.
H04N 17/00 (2006.01)
H04N 17/02 (2006.01)

(52) U.S. Cl.
USPC ........... 348/189; 348/177; 348/180; 348/744; 348/745; 359/618; 359/894; 356/388; 356/389; 356/390; 356/391; 356/392; 356/393; 356/394; 356/395; 356/396; 356/397; 356/398

(58) Field of Classification Search
USPC .......... 348/189, 177, 180, 744, 745; 359/618, 359/894; 356/388, 389, 190, 391, 392, 393, 356/394, 395, 396, 397, 398; 398/398; 250/250
See application file for complete search history.

(56) References Cited

U.S. PATENT DOCUMENTS

| 6,614,408 | B1* | 9/2003 | Mann | 345/8 |
| 7,692,820 | B2* | 4/2010 | Rogalski et al. | 358/406 |
| 2009/0283608 | A1* | 11/2009 | Crawley | 239/33 |

* cited by examiner

Primary Examiner — Jefferey Harold
Assistant Examiner — Mustafizur Rahman
(74) Attorney, Agent, or Firm — DeLio & Peterson, LLC; Thomas E. Ciesco

(57) ABSTRACT

A video calibration device comprising an elongated image tube having a length, a first opening at one end of the image tube and a second opening at the opposite end of the image tube. The device includes an elongated sensor tube having a length, a first opening at one end of the sensor tube and a second opening at the opposite end of the sensor tube. The first opening of the sensor tube is adapted to support a video calibration sensor. A video calibration sensor is disposed in the first opening of the sensor tube. The sensor tube is sealingly secured to the image tube at an angle whereby the second opening of the sensor tube and the second opening of the image tube are substantially juxtaposed.

18 Claims, 18 Drawing Sheets

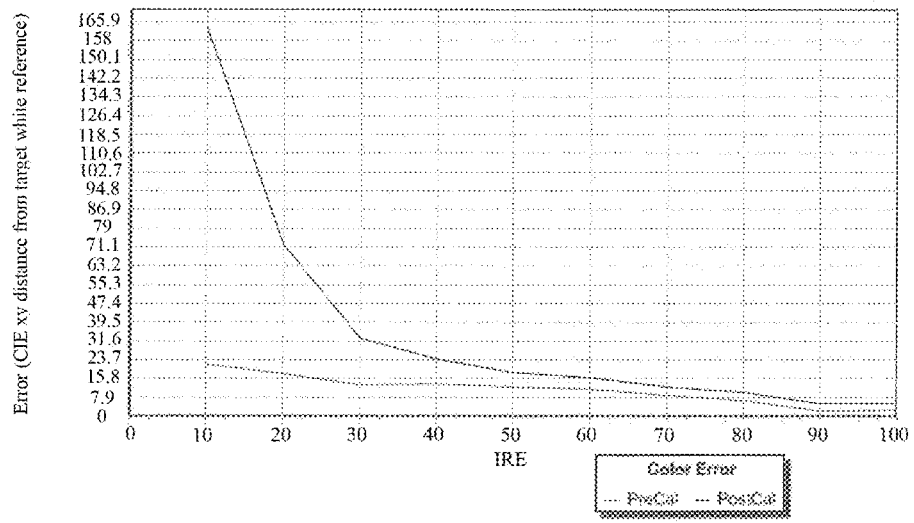
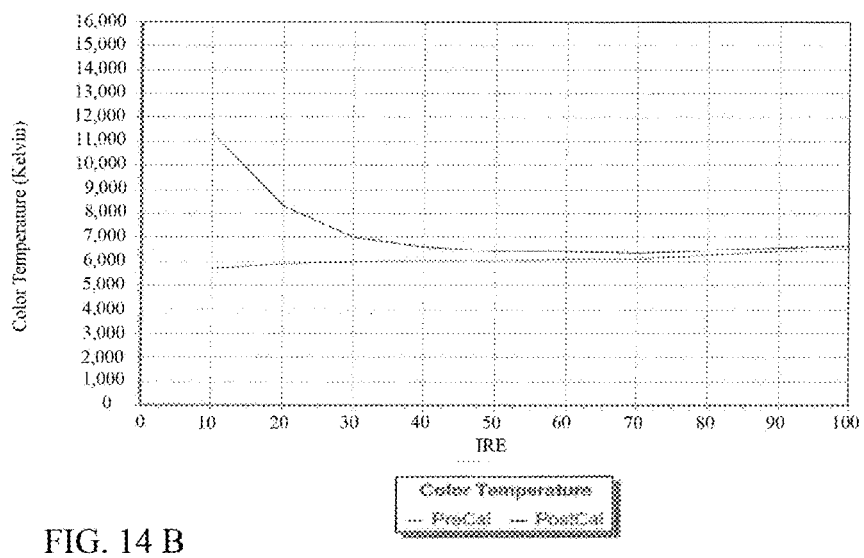
FIG. 14 B

Color Pro 6000 Display Calibration Report
OTC1000
Color Analyzer
Cal. Date: 9/4/2008 9:15:12 PM
Cal. Due: 9/4/2009
Make & Model: Epson 720 Homelite
Serial #:
Pre-Calibration · Post-Calibration
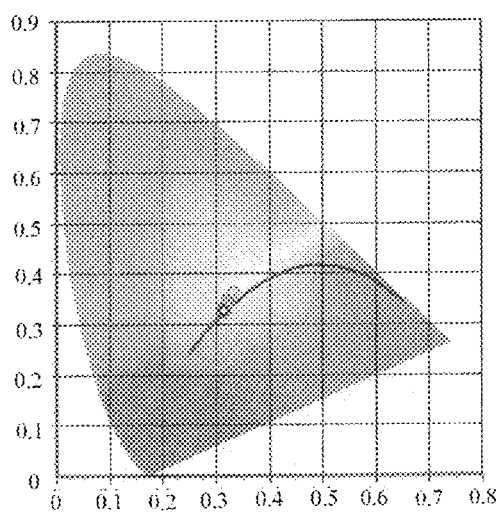 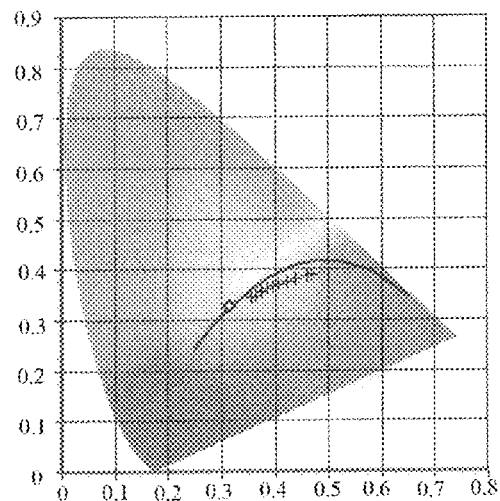
White Balance
PreCal ○   PostCal +
FIG. 15A

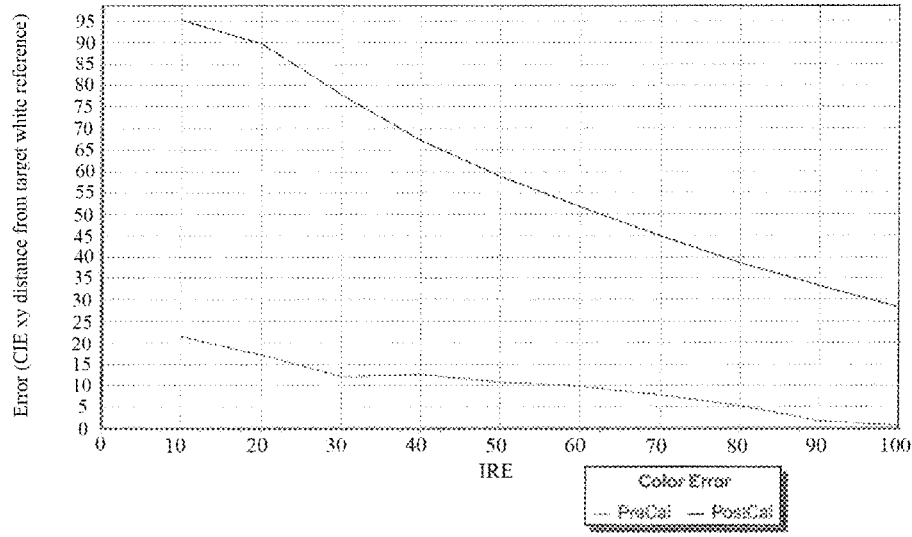
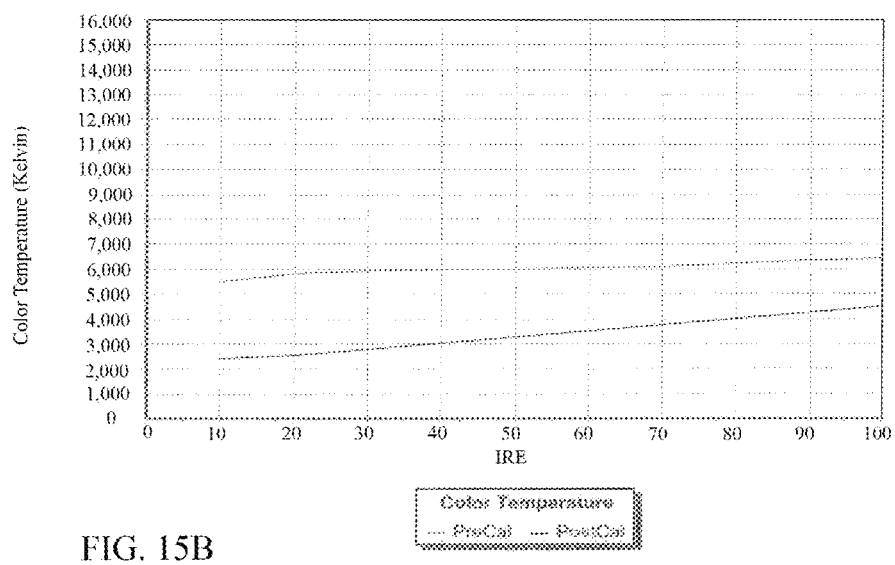
FIG. 15B

VIDEO CALIBRATION DEVICE

BACKGROUND OF THE INVENTION

1. Field of the Invention

The present invention relates to an apparatus for measuring light characteristics on a video screen and for the calibration of video output devices such as video monitors, video projectors and the like.

2. Description of Related Art

When calibrating displays such as flat screen televisions, video projector and screen systems and video monitors there are several color analyzers on the market which can accurately measure the light being emitted by the display. The analysis includes measuring light output of a display at different frequencies or different colors. Although each may measure the light emitted by the display accurately, light added to the display from other sources will be included in the analysis results. The difficulty lies in the situation where the analysis must be performed in different ambient light settings than that of during viewing of the display. An example of this would be where a calibration of a screen is performed in daylight conditions where the screen viewing will primarily be during darker conditions.

Pod style analyzers which lie flat against the screen may aid in this situation, but is usually limited to rear projection and self emitting displays such as LCD, CRT, LCOS, DLP, and Plasma. Front projector calibration cannot be performed accurately since the pod itself will block the light from reaching the screen at the position where the light sample is generally taken. Even when used on the self emitting displays, light can easily leak in between the screen and the actual sensor since most of the pods have the sensor set back a small distance from the screen by a series of suction cups.

In measuring video displays, devices which are aimed at the screen from a distance rather than being placed directly against the screen generally provide more accurate measurements. However, devices which lie against the screen may be used instead of the aiming device for the sole purpose of reducing ambient light. These devices cannot be used in front projection systems and are questionable in their ability to screen all ambient light. It would be convenient to have an analyzer system to aid in calibration of video displays during high ambient light conditions yet be able to calibrate the display properly for low or no ambient light viewing.

The problem of ambient light affecting desired readings in an optical sensor may pertain to color analyzers, spectrophotometers, tri-stimulus sensors as well as any type of optical sensor or light wave sensors. One example of an optical sensor is the OTC1000 manufactured by Sencore in South Dakota. The drawings and test data in this application use the OTC1000 as the color analyzer as a reference although the present invention may be used in combination with many light wave sensors or light wave analyzers on the market. The color analyzer, light wave analyzer, optical comparator and light analyzing are examples of devices used to analyze light projecting from a video display screen and are all devices used in combination with the ambient light block apparatus.

SUMMARY OF THE INVENTION

Bearing in mind the problems and deficiencies of the prior art, it is therefore an object of the present invention to provide a video calibration device which allows accurate analysis of a video image regardless of ambient light conditions.

It is another object of the present invention to provide a video calibration device to aid in the calibration of a video display used in viewing video material in light conditions which are different from light conditions existing during calibration.

A further object of the invention is to provide a light blocking apparatus which allows accurate light wave analysis using a color analyzer.

It is yet another object of the present invention to provide a light blocking apparatus which allows accurate light wave analysis by a light wave analyzer.

It is another object of the present invention to provide a front seal which blocks light from entering the apparatus along the screen contact area and prevents damage from the apparatus being against the screen.

It is another object of the present invention to provide a light block apparatus which will attach to the light wave analyzer.

It is another object of the present invention to provide a light block apparatus mountable on a tripod wherein the apparatus includes a mount adapted to engage the light wave analyzer.

It is another object of the present invention to provide a light absorbing coating for the light block apparatus adapted to prevent reflection of light therefrom onto the screen.

Still other objects and advantages of the invention will in part be obvious and will in part be apparent from the specification.

The above and other objects, which will be apparent to those skilled in the art, are achieved in the present invention which is directed to a video calibration device comprising an elongated image tube having a length, a first opening at one end of the image tube and a second opening at the opposite end of the image tube. The device includes an elongated sensor tube having a length, a first opening at one end of the sensor tube and a second opening at the opposite end of the sensor tube. The first opening of the sensor tube is adapted to support a video calibration sensor. The video calibration sensor is disposed in the first opening of the sensor tube. The sensor tube is sealingly secured to the image tube at an angle whereby the second opening of the sensor tube and the second opening of the image tube are substantially juxtaposed.

The video calibration device preferably includes a sealing ring sealingly disposed adjacent the second opening of the image tube. More preferably, the sealing ring is pivotal about the second opening of the image tube. The sealing ring includes at least one flexible finger adapted to seal against a video screen upon which the sealing ring is placed. The sealing ring preferably includes a plurality of fingers, many of which overlap others to prevent light leakage. The fingers may alternately be small diameter elongated bristles as would be disposed on a brush. The video calibration device preferably includes an iris disposed in the first opening of the image tube. The iris may be fixed or have an adjustable inside diameter.

The second end of the image tube is adapted to be placed sealingly against a video screen and the image tube is adapted to pass light therethrough. The video sensor is preferably separable from the sensor tube. The image tube includes an interior wall having a surface which prevents reflection of light.

The video calibration device preferably includes a tripod adapter for fastening the device to a tripod. Preferably the image tube is mounted to the tripod. Alternately, the sensor tube may be adapted to be mounted to the video calibration sensor. The video calibration device may include an opaque support disposed in the first opening of the sensor tube which includes a support opening for engaging the optical sensor. The support is adapted to block light from entering the sensor tube. The first opening of the sensor tube may include at least one groove adapted to slidingly engage a protrusion disposed on the optical sensor.

In another embodiment the present invention is directed to an ambient light block apparatus comprising an elongated image tube having a length, a first opening at one end of the image tube and a second opening at the opposite end of the image tube. The apparatus includes an elongated sensor tube having a length, a first opening at one end of the sensor tube and a second opening at the opposite end of the sensor tube. The first opening of the sensor tube is adapted to support a video calibration sensor. The sensor tube is sealingly secured to the image tube at an angle whereby the second opening of the sensor tube and the second opening of the image tube are substantially juxtaposed.

In another embodiment the present invention is directed to a method for using a video calibration device. The method includes providing a video calibration device having an elongated image tube with a first opening at one end of the image tube and a second opening at the opposite end of the image tube, and an elongated sensor tube having a first opening at one end of the sensor tube and a second opening at the opposite end of the sensor tube. The first opening of the sensor tube is adapted to support a video calibration sensor and a video calibration sensor disposed in the first opening of the sensor tube. The sensor tube is sealingly secured to the image tube at an angle, the second opening of the sensor tube and the second opening of the image tube substantially juxtaposed. The method includes providing a video screen and an image projecting device, placing the second opening of the image tube adjacent the video screen and projecting a calibration image through the image tube and onto a portion of the video screen adjacent the second opening of the image tube. The method includes measuring the light characteristics detected by the video calibration sensor.

The method may include an opaque support disposed in the first opening of the sensor tube which includes a support opening for engaging the video calibration sensor.

Another embodiment the present invention provides for a video calibration aid comprising a first and second tube section each having opaque walls, the sections being joined at an acute angle whereby the sections having separate first ends and common second ends. The first end of the first tube section is preferably adapted to engage an optical sensor and the common second ends are adapted to substantially seal against a video screen.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIGS. 14A-14D are results of a pre and post calibration report based on using the light block apparatus with an OTC-1000 calibration sensor.

FIGS. 15A-15D are results of a of a pre and post calibration report based on using an OTC-1000 calibration sensor without the use of the light blocking apparatus.

DESCRIPTION OF THE PREFERRED EMBODIMENT(S)

In describing the preferred embodiment of the present invention, reference will be made herein to FIGS. 1-15 of the drawings in which like numerals refer to like features of the invention.

The device of the present invention is a video calibration device which includes a light block apparatus and preferably includes a calibration sensor. The calibration sensor may be a light wave analyzer, color analyzer, spectrophotometer, optical sensor, tri-stimulus sensor, video calibration sensor or any of a variety of devices used to measure qualities of light for the purpose of calibration or analysis.

Figure 1:
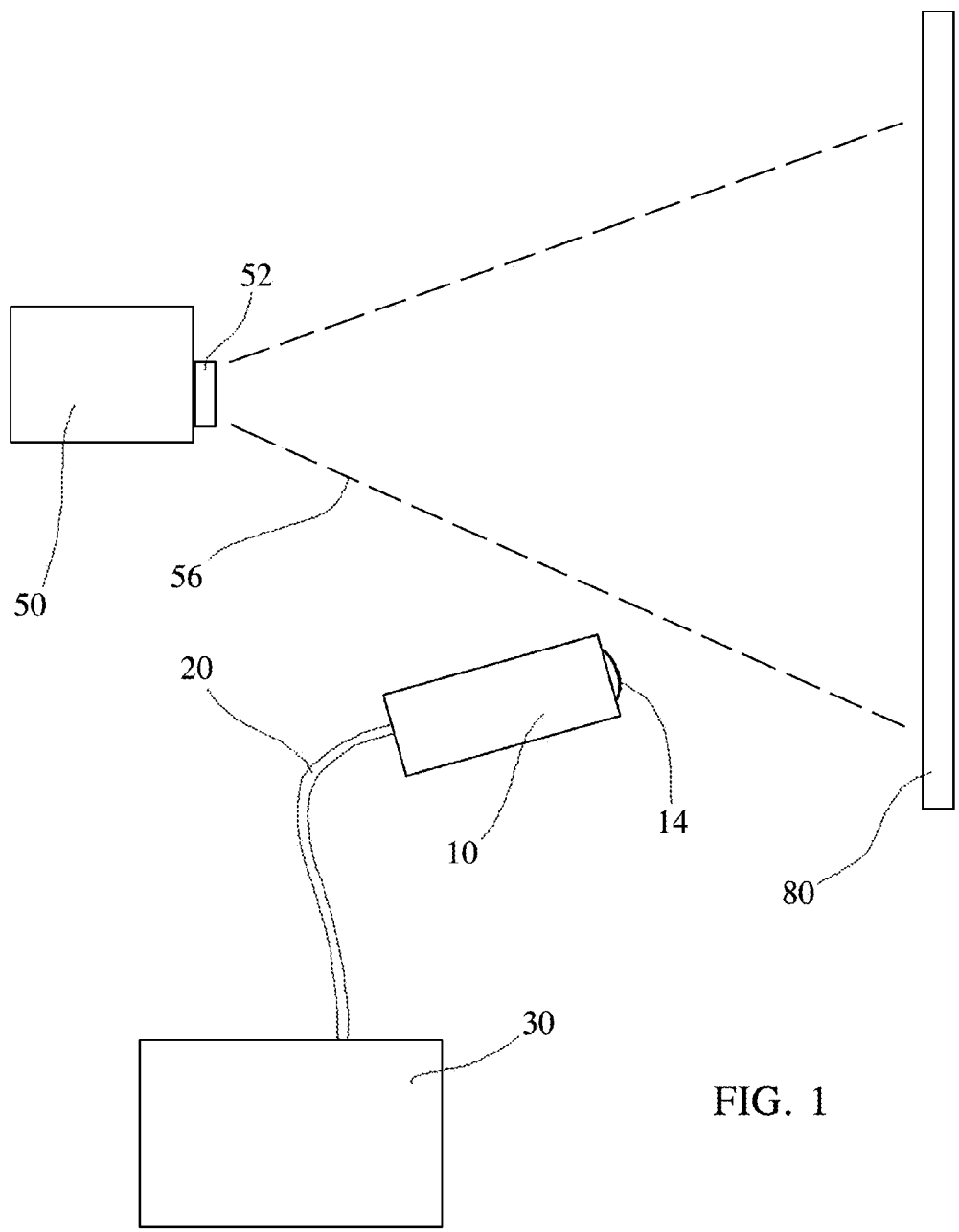
FIG. 1 is a schematic of a light wave analysis system.

FIG. 1 shows a video calibration system which includes a light wave analyzer or optical sensing device 10 and a computer 30 with software for analysis of a signal sent by the sensor 10 through a connectivity source 20, the connectivity source preferably being a wire cable but alternatively implementing a signal using infrared waves or higher frequency signal waves. A projector 50 projects a video image 56 through the projector lens 52 to a screen 80. Light from the image 56 reflects off the screen 80 and to the optical sensing device lens 14. Analyzer 10 converts the light entering the lens 52 into electrical signals which are sent to the computer. Software on the computer process the signal to visually show statistics according to frequency, luminescence, chroma values, and various other parameters in or about the visual light spectrum.

Figure 2:
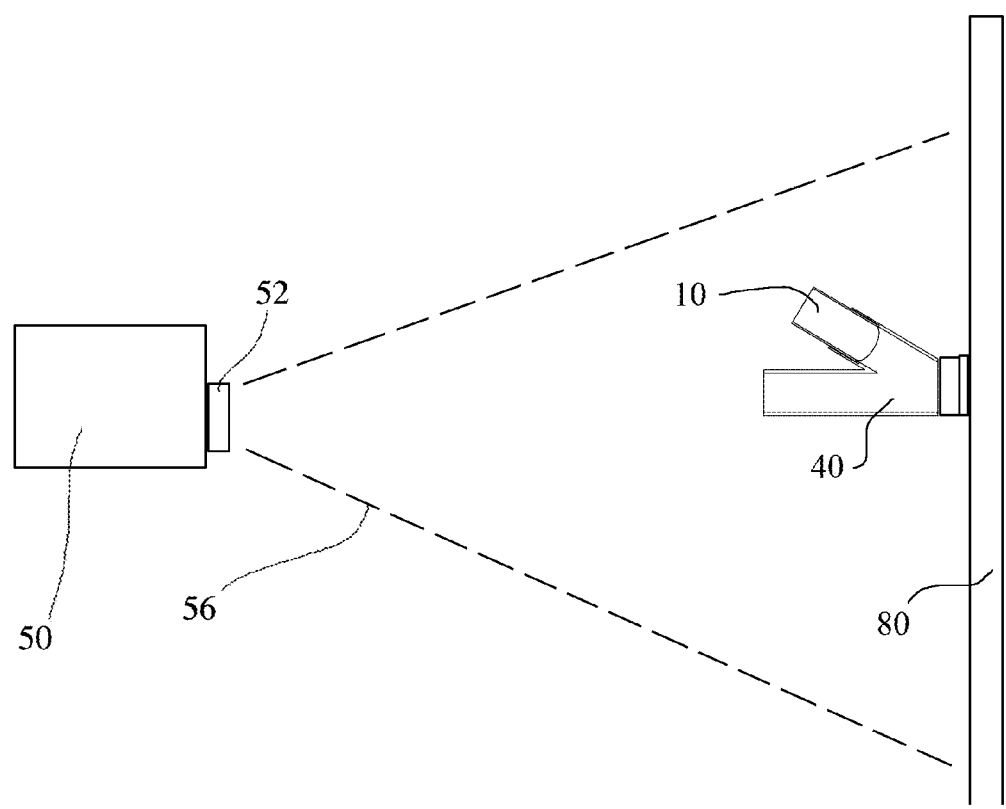
FIG. 2 is a top plan view of the light block apparatus as it is used with a color analyzer according to the present invention.

FIG. 2 shows the light block apparatus as it is placed in the path of the image projected from the projector.

Figure 3:
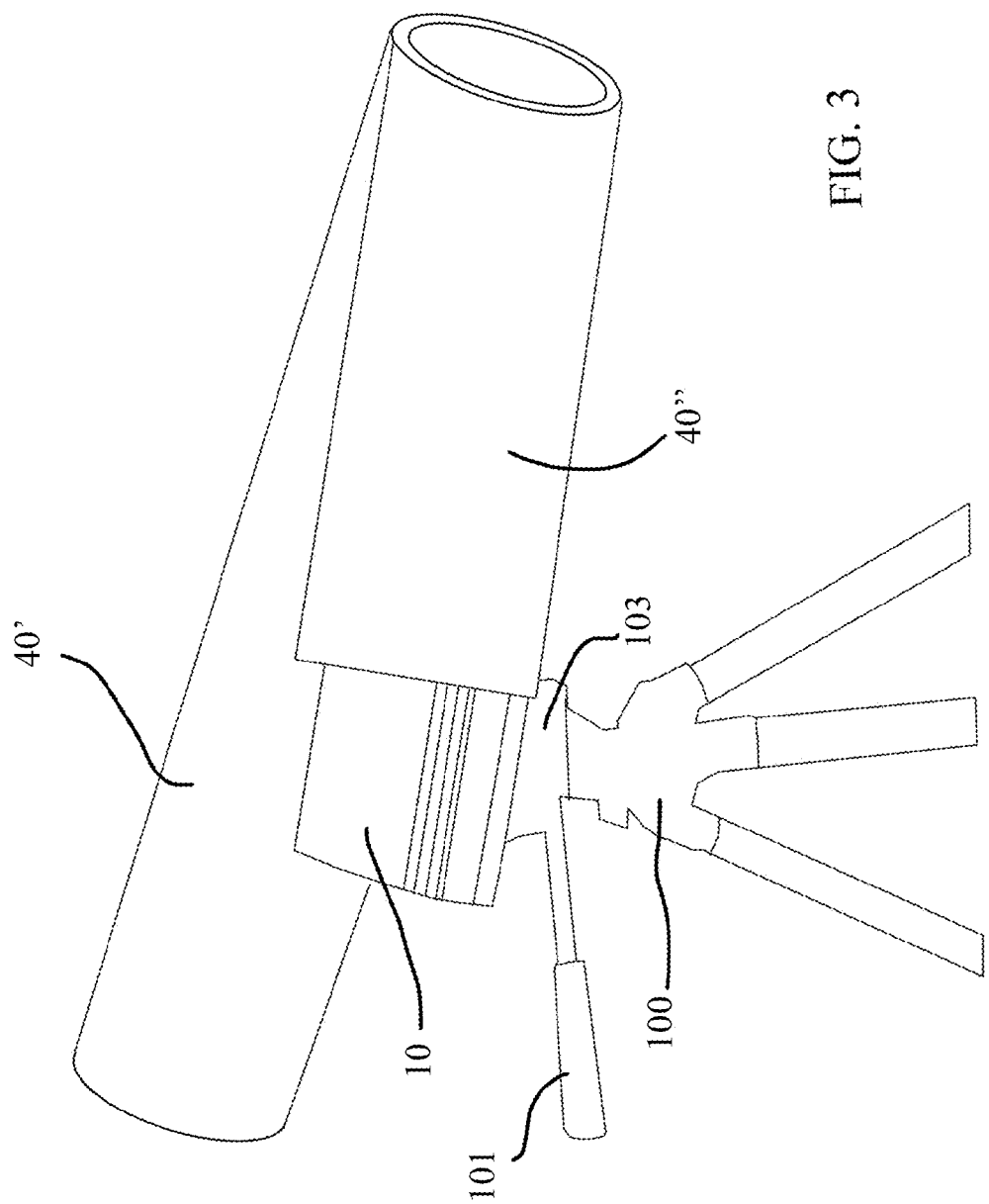
FIG. 3 is a perspective view of the light blocking apparatus having an analyzer aimer according to the present invention

FIG. 3 is a perspective view of the light blocking apparatus which is slidable over the analyzer. The analyzer is mounted to a tripod 100 having a swiveling head 103 secured by twisting handle 101.

Figure 4:
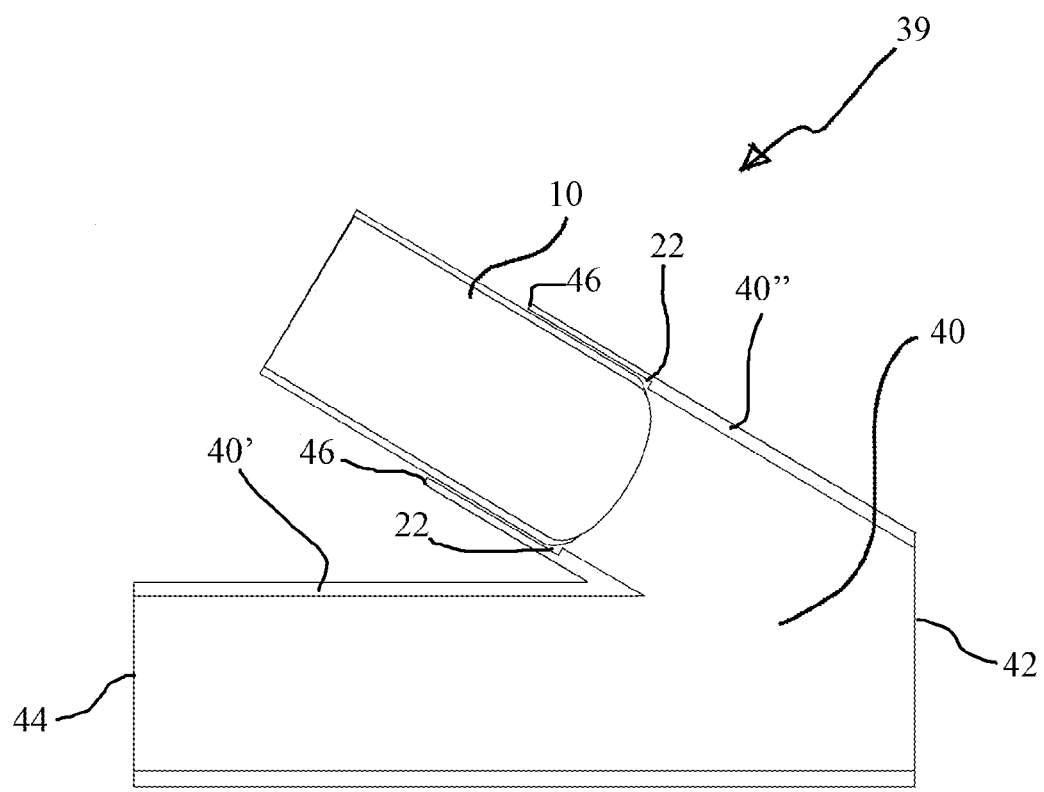
FIG. 4 is a top cross sectional view of the light block apparatus shown in FIG. 5A according to the present invention.

As shown in FIG. 4, the video calibration device 39 comprises a light blocking apparatus 40 which includes an image tube or image tube 40' which intersects a sensor tube 40" at an angle. The image tube has a first end 44 opposite a second opening 42. The sensor tube has a first opening 46 opposite the second opening 42 of the image tube 40'. The second opening of the image tube and the second opening of the sensor tube are substantially the same opening and may be referred to as juxtaposed. At least a portion of the analyzer 10 is attached to the first opening of the sensor tube 40" by at least one groove 22 in the sensor tube. The analyzer is positioned such that the analyzer sensor picks up the reflected light from the approximate center of the opening at the second opening 42 formed at the front of the light block apparatus where the image tube and the sensor tube terminate at the second opening.

Figure 5A:
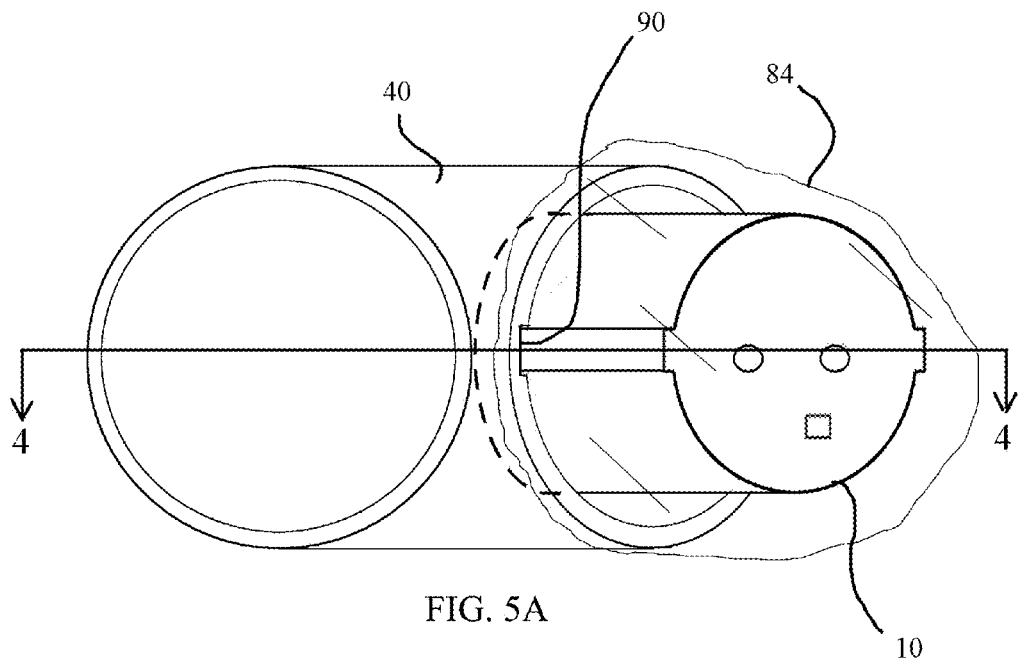
FIG. 5A is a rear elevational view of the light blocking apparatus having an analyzer according to the present invention.
Figure 5B:
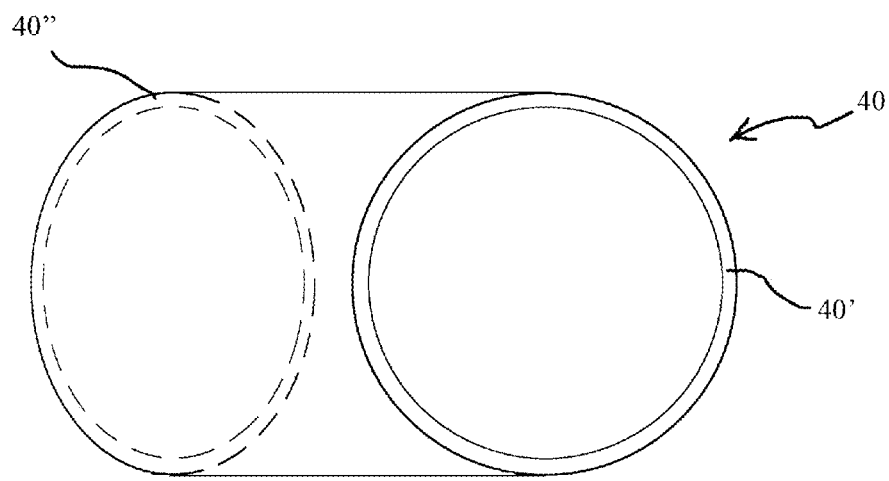
FIG. 5B is a front elevational view of the light blocking apparatus without an analyzer according to the present invention
Figure 6:
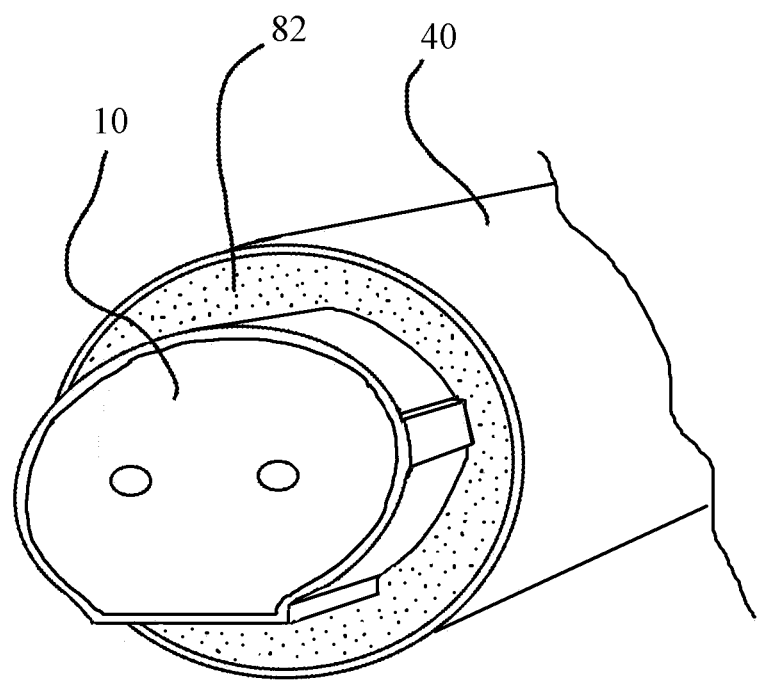
FIG. 6 is a perspective view of the light blocking apparatus having a light blocking insert in contact with the light wave analyzer according to the present invention.

FIG. 5A is a rear view of the light blocking apparatus with an analyzer attached to the sensor tube. An opaque light shield 84 may be placed over the sensor tube first opening 46 and analyzer for preventing light from passing through the sensor tube to the screen. The light shield is preferably a dark flexible material. FIG. 6 shows an alternate embodiment of the light shield. A plastic or foam insert 82 is used to block ambient light from entering the sensor tube 40" and secures the optical sensor 10 in place. FIG. 5B is a front elevational view of the light blocking apparatus without the analyzer attached.

Figure 7:
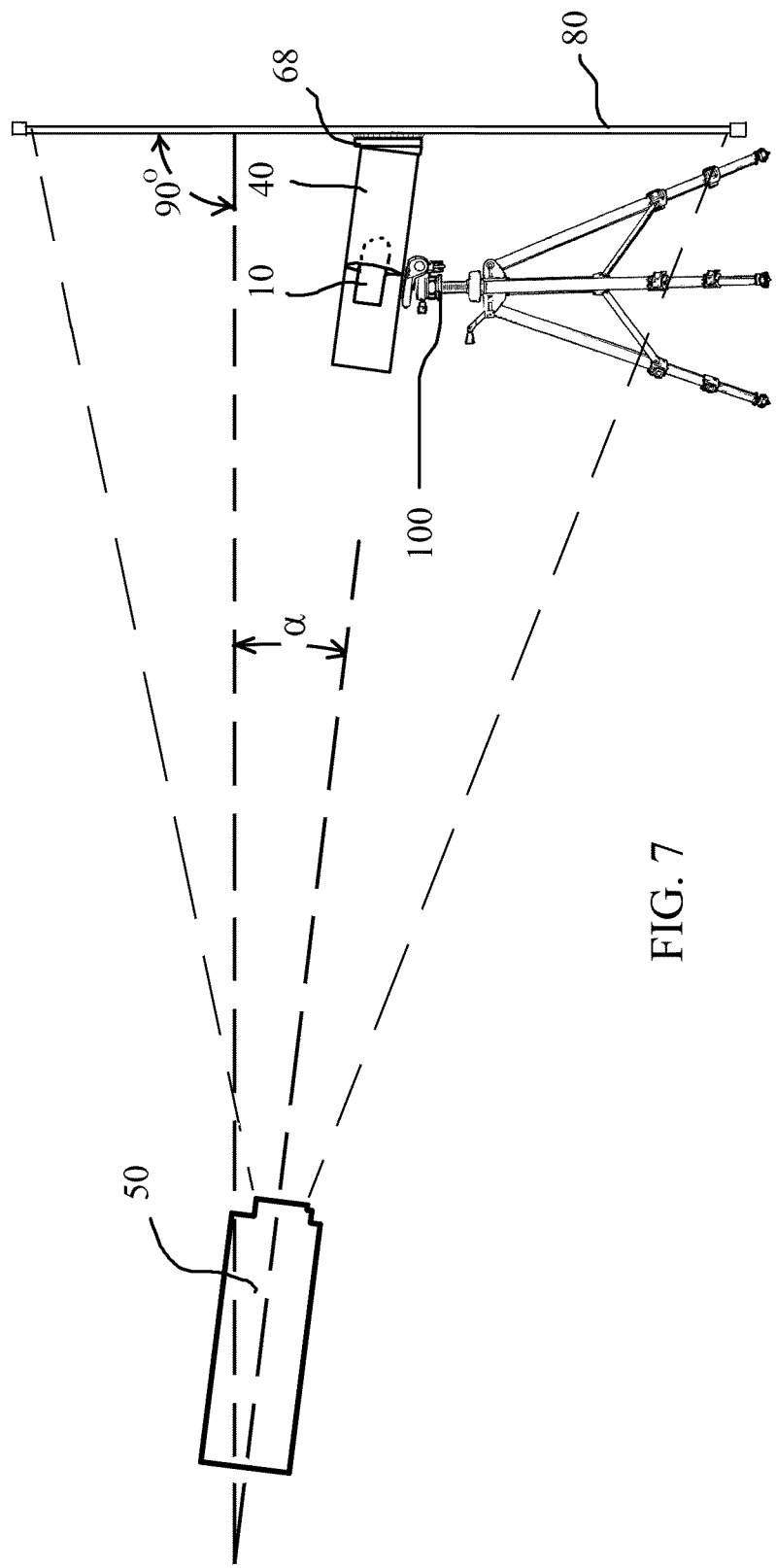
FIG. 7 is a right elevational view of the light blocking apparatus attached to a tripod as it is used in a projection system according to the present invention.

FIG. 7 shows the light blocking apparatus 40 mounted to a tripod head 100. The analyzer or video calibration sensor is slidingly attached to the sensor tube. A locking feature may additionally be used to secure the analyzer to the light blocking apparatus 40. The image tube is placed at an angle to the screen a so that the light from the projector 50 passes straight through the image tube. If the image tube were to be placed perpendicular to the screen while the projector is at an angle to the screen, the projected image would strike the interior wall of the image tube, giving an incorrect image on the portion of the screen within the second opening of the image tube.

Figure 8:
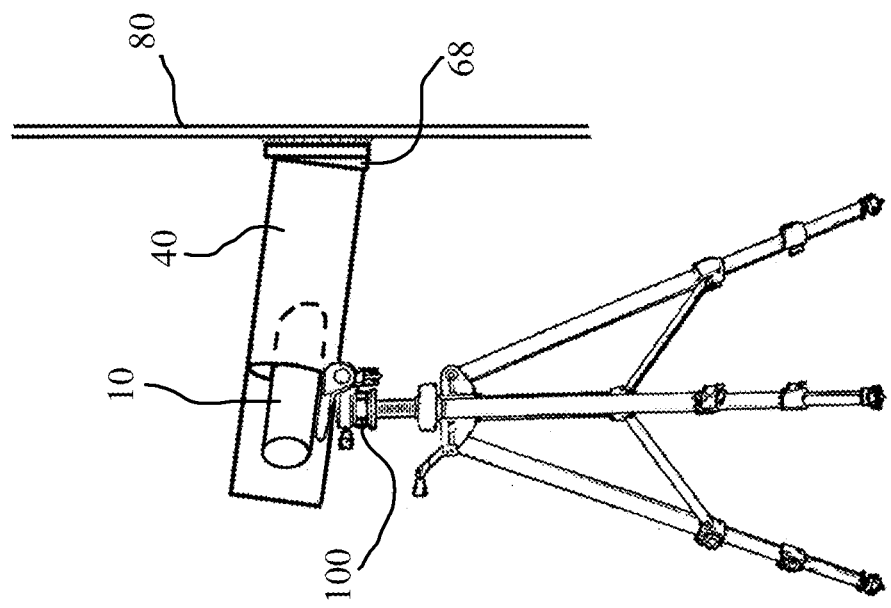
FIG. 8 is a right elevational view of the light blocking apparatus attachable to a light wave analyzer on a tripod according to the present invention.
Figure 9:
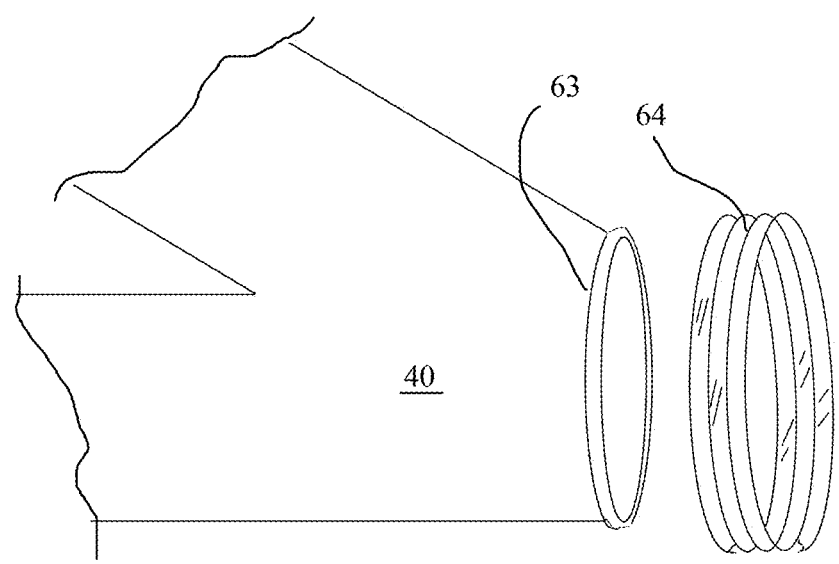
FIG. 9 is a perspective view of the front of the light blocking apparatus having a front ring sealable with the display surface according to the present invention.

FIG. 8 is an alternate embodiment of the mount wherein the analyzer is directly attached to the tripod head 100. The light blocking apparatus 40 is mounted slidingly to the analyzer.

In another feature of the present invention, the light blocking apparatus 40 includes a ring or light seal 64 which lies near or against the screen 80 and a rotating portion 63 attached to the second opening 42 of the light block tube, adapted to allow rotation of the light seal about the central axis of the image tube 40'. The front portion of the light seal 64 is a non abrasive ring which may be placed against the screen 80 without scratching the screen and adapted to block at least substantially all light from passing therethrough. The light seal is preferably a light tension spring adapted to urge the seal against the screen to block substantially all light from passing to the interior of the ring.

Figure 10:
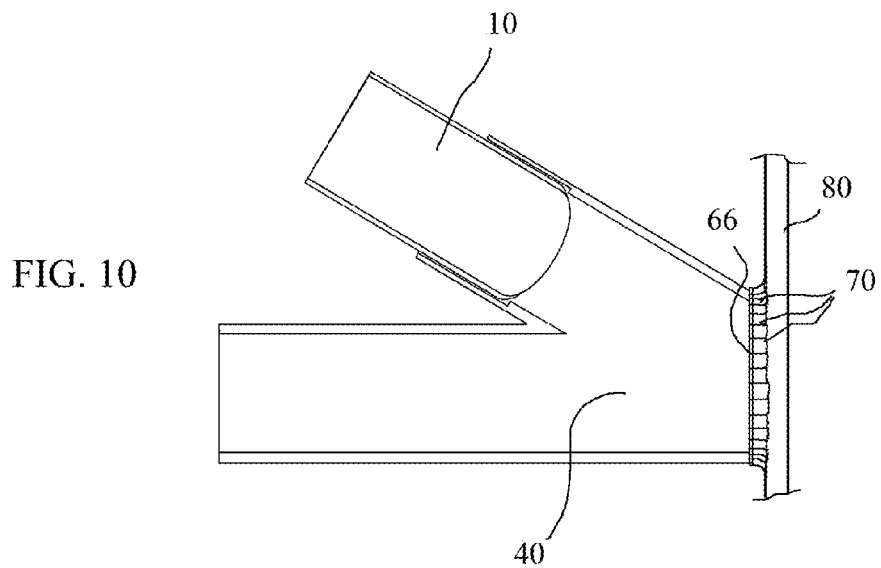
FIG. 10 is a perspective view of an alternate embodiment of the front ring seal of the light blocking apparatus according to the present invention.

FIG. 10 is an alternate embodiment of the light seal. At least one flexible finger 70 is attached to the opening 42 or second opening. The fingers are placed against the screen to block light from passing therethrough. The fingers may be mounted to a rotatable ring 66 attached to the opening 42. The rotation of the ring allows the fingers to have different lengths to enable the light block apparatus to be place against the screen 80 at an angle.

Figure 11:
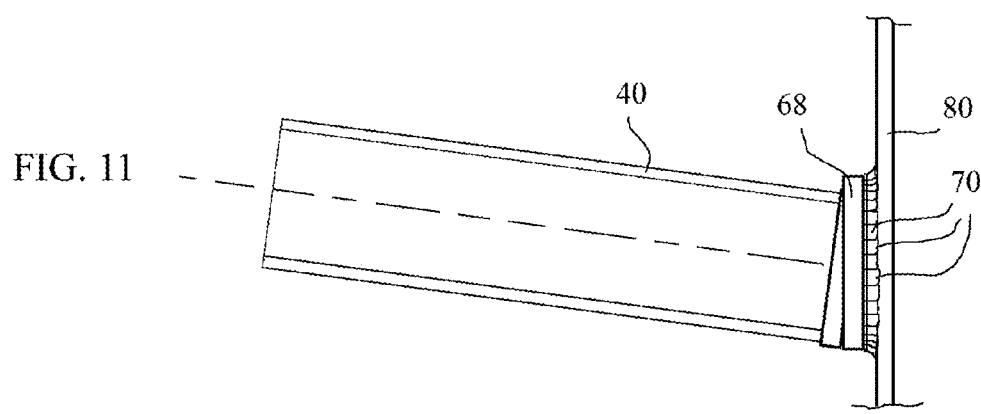
FIG. 11 is a perspective view of a third embodiment of the front ring seal of the light blocking apparatus according to the present invention.
Figure 12:
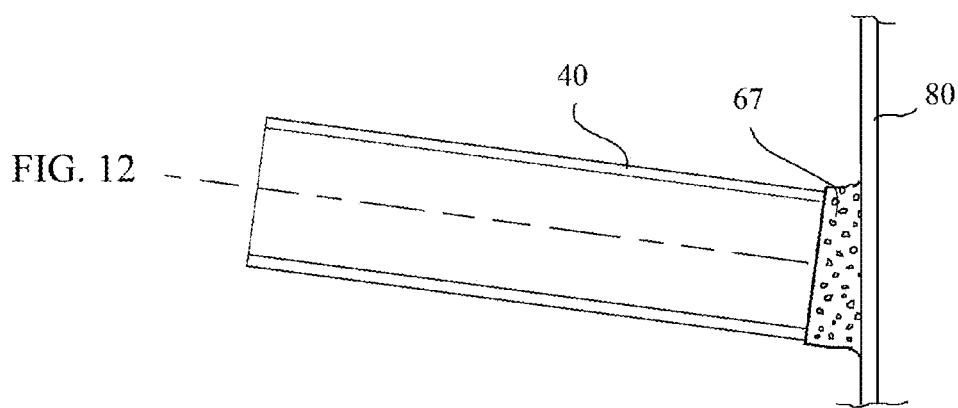
FIG. 12 is a perspective of a fourth embodiment of the front ring seal of the light blocking apparatus according to the present invention.
Figure 14A:
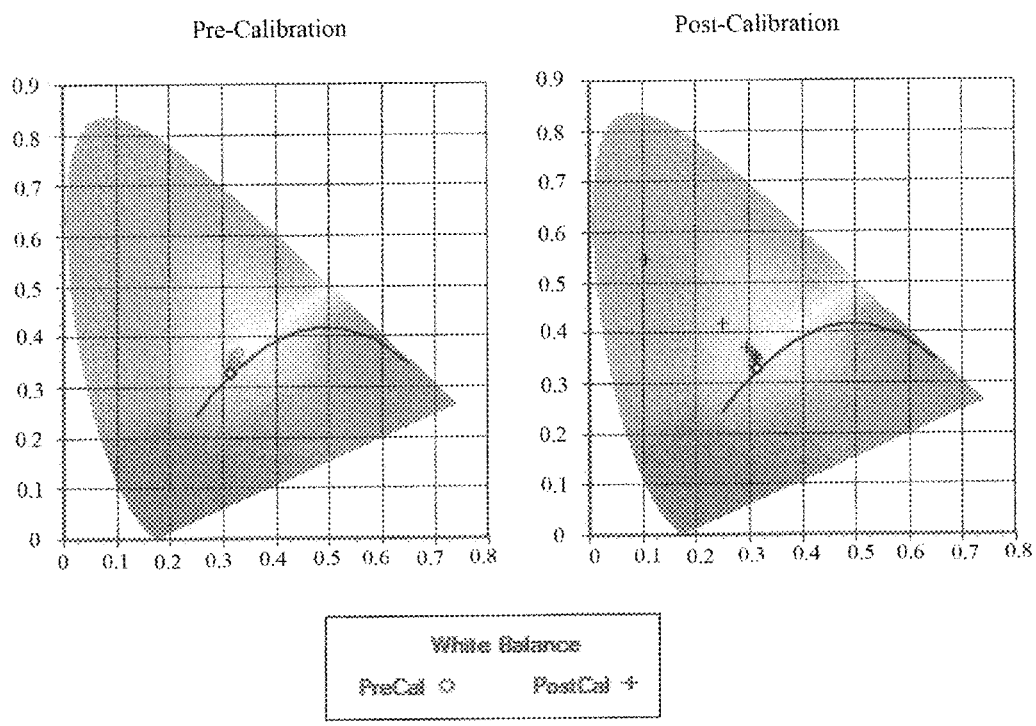
Figure 14C:
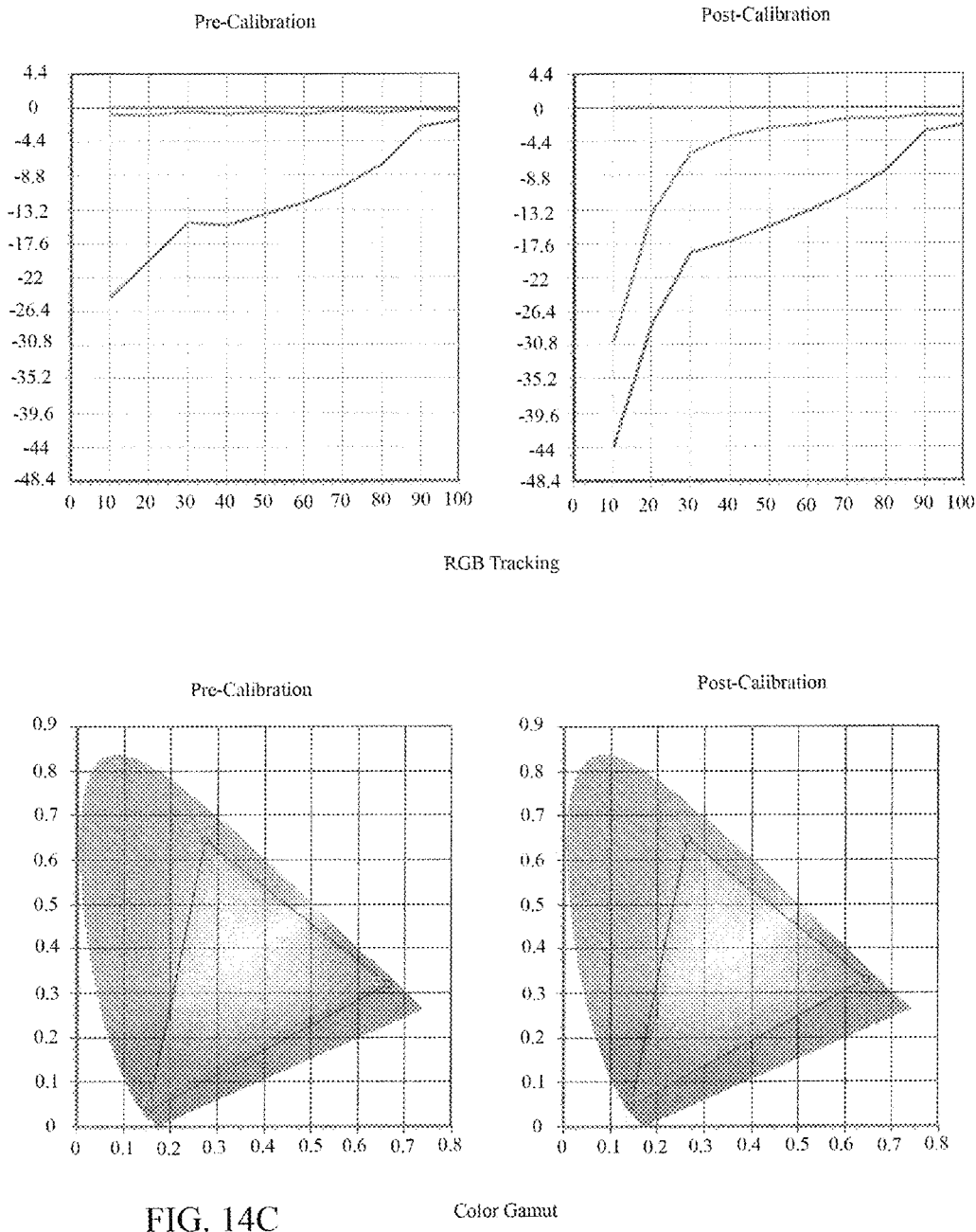
Figure 14D:
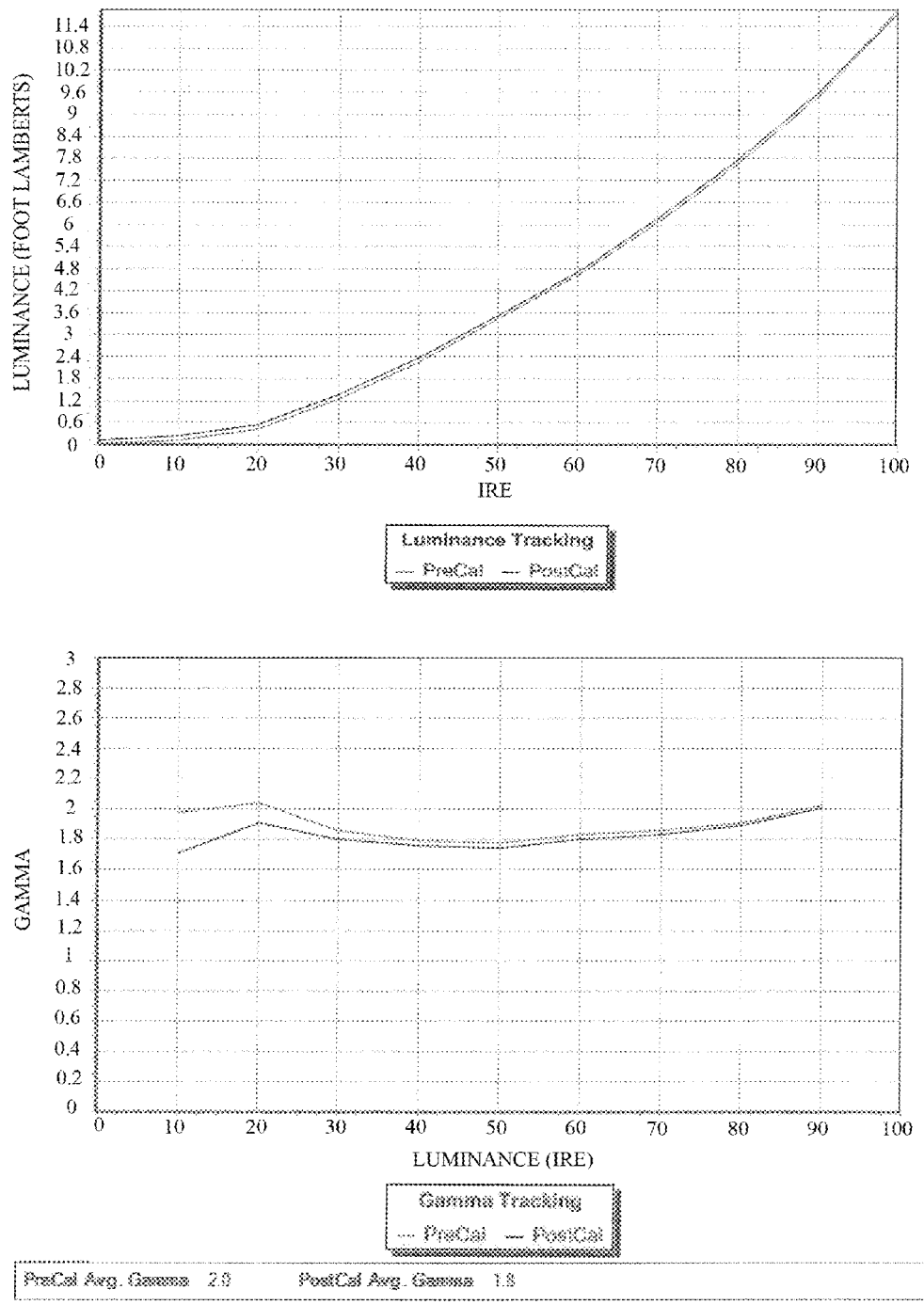
Figure 15C:
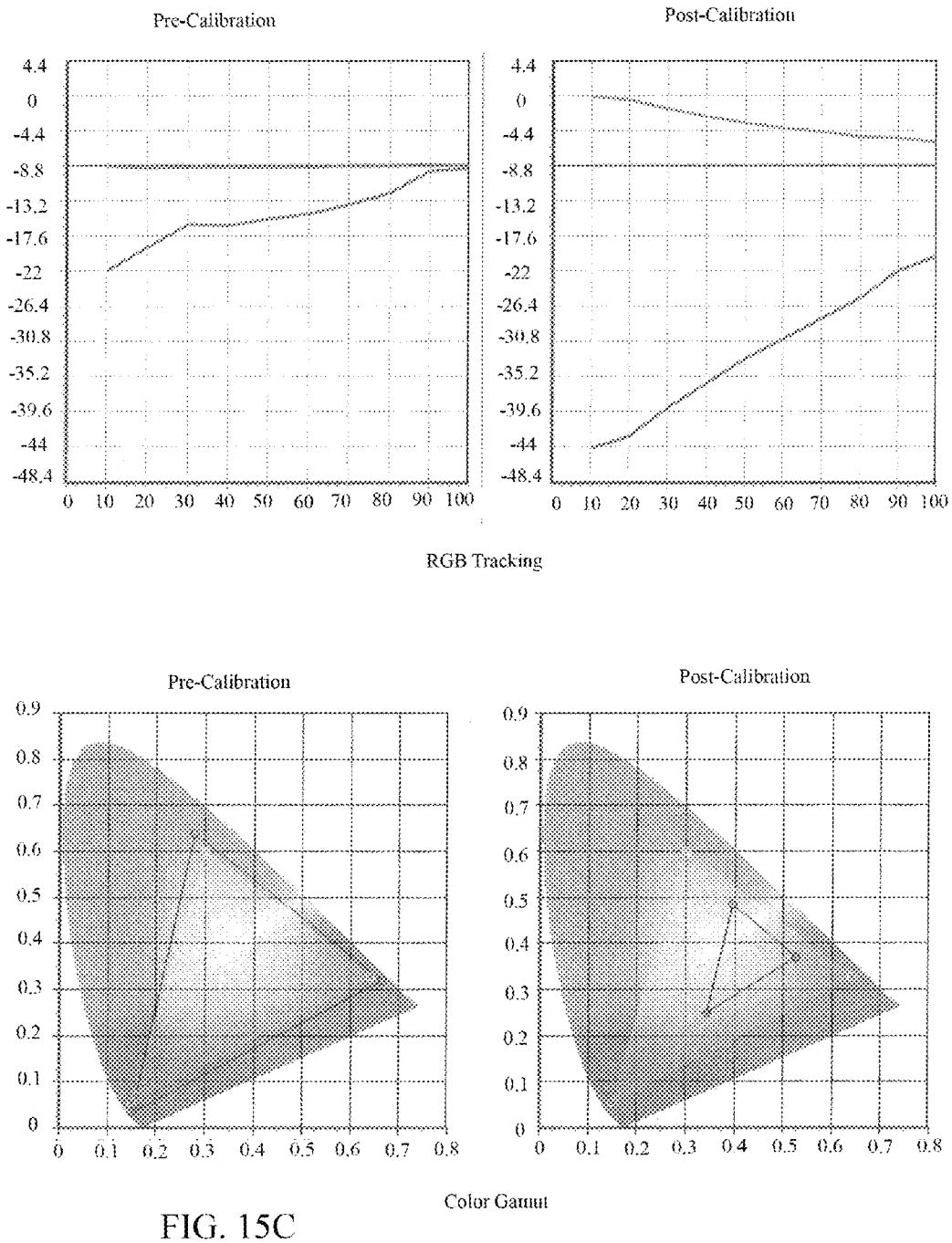
Figure 15D:
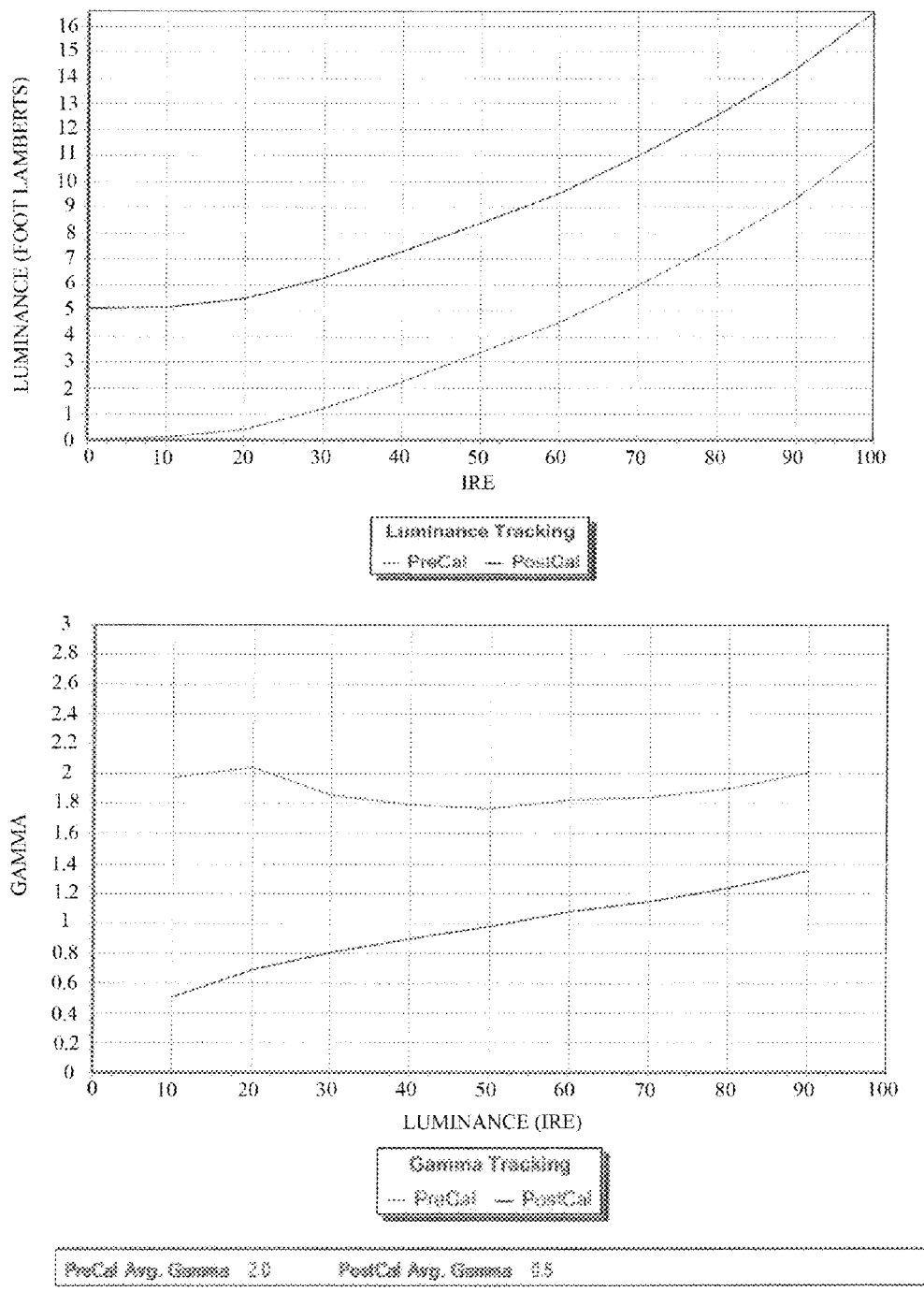

FIG. 11 is a third embodiment to the light seal. A pivotable portion 68 allows for the fingers to contact the screen evenly when the light blocking apparatus is at an angle to the screen 80. FIG. 12 is a fourth embodiment of the light seal 67. The seal 67 may be foam or other compressible material.

Figure 13:
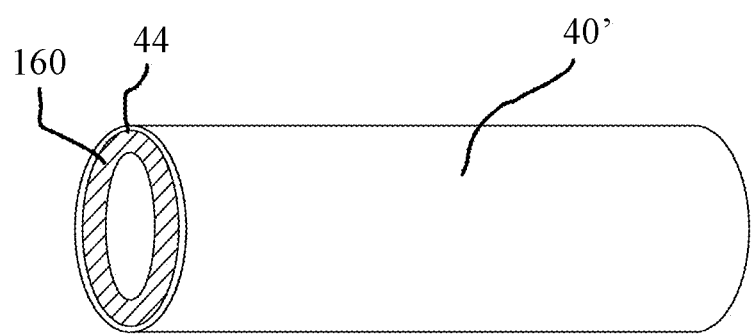
FIG. 13 is a perspective view of the first opening of the image tube which includes an iris lens.

FIG. 13 shows an opaque iris lens which decreases the aperture of the first opening of the image tube. The lens has an outer diameter sized to fit onto the image tube and an inner diameter smaller than the outer diameter. The iris lens may be fixed or may be adjustable so that the aperture may be changed depending upon calibration conditions. Decreasing the aperture slightly with respect to the first opening of the image tube allows the video image to pass through the image tube without the image converging on the tube wall. Further decreasing the aperture allows the user to place the video calibration device against the screen without having to aim the image tube at an angle $\alpha'$ substantially identical to the projection angle $\alpha$.

In a method of using the video calibration device 39, the projector 50 and screen 80 are set up with the projector displaying the desired image onto the screen and the calibrator (person performing a calibration) places the second opening 42 of the image tube against the screen, preferably having the device mounted on a tripod or stand. With the calibration sensor 10 removed, the calibrator looks into the first opening of the sensor tube and adjusts the angle of the image tube so that the image projected onto the screen by the projector or image projection device 50 and through the image tube is centered in the second opening of the image tube. The iris lens will allow projection of a circular image slightly smaller than the diameter of the second opening, allowing centering of the image. Once the image is centered, the video calibration is locked into position by tightening the adjustments on the tripod. The calibration sensor may then be secured in the first opening of the sensor tube. Alternately, if the calibration sensor is not easily removable, a slidable window may be placed in the wall of the image tube or the sensor tube so the calibrator may look through the window to look at the portion of the screen within the second opening of the image tube.

The calibration reports in FIGS. 14A-14D are a pre and post calibration report based on using the light block apparatus with an OTC-1000 analyzer and CP6000 software by Sencore. The pre-calibration readings were taken during low ambient light conditions while the post-calibration readings were taken during high ambient light conditions. FIGS. 15A-15D are reports is based on using an OTC-1000 without the light blocking apparatus. Again, the pre-calibration readings were taken during low ambient light conditions while the post-calibration readings were taken during high ambient light conditions. These reports may be analyzed in combination, but the main purpose of the reports are to compare the low ambient light conditions such as would be present in a well designed home theater or in a cinema using only the analyzer to the results of the analyzer used with the light blocking apparatus in a high ambient light condition.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A video calibration device comprising:
   an elongated image tube having a length, a first opening at one end of the image tube and a second opening at the opposite end of the image tube;

an elongated sensor tube having a length, a first opening at one end of the sensor tube and a second opening at the opposite end of the sensor tube, the first opening adapted to support a video calibration sensor; and a video calibration sensor disposed in the first opening of the sensor tube;

wherein the sensor tube is sealingly secured to the image tube at an angle, the second opening of the sensor tube and the second opening of the image tube substantially juxtaposed.

2. The video calibration device of claim 1 including a sealing ring sealingly disposed adjacent the second opening of the image tube.

3. The video calibration device of claim 2 wherein the sealing ring is pivotal about the second opening of the image tube.

4. The video calibration device of claim 2 wherein the sealing ring includes at least one flexible finger adapted to seal against a video screen upon which the sealing ring is placed.

5. The video calibration device of claim 1 including an iris disposed in the first opening of the image tube.

6. The video calibration device of claim 1 wherein the second end of the image tube is adapted to be placed sealingly against a video screen and the image tube is adapted to pass light therethrough.

7. The video calibration device of claim 1 wherein the sensor is separable from the sensor tube.

8. The video calibration device of claim 1 wherein the image tube includes an interior wall along the length thereof, the wall having a surface which prevents reflection of light.

9. The video calibration device of claim 1 wherein the video calibration device includes a tripod adapter for fastening the device to a tripod.

10. The video calibration device of claim 1 wherein the image tube is adapted to be mounted on an video calibration sensor.

11. The video calibration device of claim 1 including an opaque support disposed in the first opening of the sensor tube which includes a support opening for engaging the video calibration sensor.

12. The video calibration device of claim 1 wherein the first opening of the sensor tube includes at least one groove adapted to slidingly engage a protrusion disposed on the video calibration sensor.

13. A method for using a video calibration device comprising:

providing a video calibration device having an elongated image tube with a first opening at one end of the image tube and a second opening at the opposite end of the image tube, an elongated sensor tube having a first opening at one end of the sensor tube and a second opening at the opposite end of the sensor tube, the first opening adapted to support an video calibration sensor and a video calibration sensor disposed in the first opening of the sensor tube wherein the sensor tube is sealingly secured to the image tube at an angle, the second opening of the sensor tube and the second opening of the image tube substantially juxtaposed;

providing a video screen;

providing an image projecting device;

placing the second opening of the image tube adjacent the video screen;

projecting an calibration image through the image tube and onto a portion of the video screen adjacent the second opening of the image tube; and measuring the light characteristics detected by the video calibration sensor.

14. The method of claim 13 including a sealing ring sealingly disposed adjacent the second opening of the image tube.

15. The method of claim 14 wherein the sealing ring is pivotal about the second opening of the image tube.

16. The method of claim 14 wherein the sealing ring includes at least one flexible finger adapted to seal against a video screen upon which the sealing ring is placed.

17. The method of claim 13 wherein the sensor is separable from the sensor tube.

18. The method of claim 13 wherein the image tube includes an interior wall along the length thereof, the wall having a surface which prevents reflection of light.

* * * * *